(12) United States Patent
Unru et al.

(10) Patent No.: US 11,855,459 B2
(45) Date of Patent: Dec. 26, 2023

(54) METHOD FOR THREE-PHASE SUPPLY INTO AN ALTERNATING VOLTAGE NETWORK, AND THREE-PHASE INVERTER

(71) Applicant: SMA Solar Technology AG, Niestetal (DE)

(72) Inventors: Alexander Unru, Baunatal (DE); Moritz Welker, Zierenberg (DE); Neidhardt Bechtel, Kassel (DE); Sybille Pape, Vellmar (DE)

(73) Assignee: SMA Solar Technology AG, Niestetal (DE)

( * ) Notice: Subject to any disclaimer, the term of this patent is extended or adjusted under 35 U.S.C. 154(b) by 41 days.

(21) Appl. No.: 17/473,150

(22) Filed: Sep. 13, 2021

(65) Prior Publication Data

US 2021/0408793 A1    Dec. 30, 2021

Related U.S. Application Data

(63) Continuation of application No. PCT/EP2020/056876, filed on Mar. 13, 2020.

(30) Foreign Application Priority Data

Mar. 14, 2019  (DE) .................. 10 2019 106 583.6

(51) Int. Cl.
  *H02M 7/5387*  (2007.01)
  *H02J 3/26*    (2006.01)
(52) U.S. Cl.
  CPC .......... *H02J 3/26* (2013.01); *H02M 7/53875* (2013.01)

(58) Field of Classification Search
  CPC .. H02J 3/26; H02M 7/53875; H02M 7/53876; H02M 7/5388; H02M 7/539;
  (Continued)

(56) References Cited

U.S. PATENT DOCUMENTS

| | | |
|---|---|---|
| 2005/0281067 A1 | 12/2005 | Deng |
| 2007/0179720 A1 | 8/2007 | Becker |

(Continued)

FOREIGN PATENT DOCUMENTS

| | | |
|---|---|---|
| DE | 102011085676 A1 | 5/2013 |
| WO | 2018122391 A1 | 7/2015 |

OTHER PUBLICATIONS

International Search Report dated Apr. 21, 2020in connection with PCT/EP2020/056876.

*Primary Examiner* — Nguyen Tran
(74) *Attorney, Agent, or Firm* — Eschweiler & Potashnik, LLC

(57) ABSTRACT

A method for three-phase infeed of electrical power from a DC source into a three-phase AC grid by means of an inverter includes measuring phase-specific grid voltages of the three-phase AC grid, and determining a grid frequency from the measured phase-specific grid voltages. The method also includes generating phase-specific voltage reference values from the phase-specifically measured grid voltages and the determined grid frequency, and generating phase-specific target current values using phase-specific predetermined target current amplitude values, the phase-specific voltage reference values and respective grid voltage amplitudes.

11 Claims, 3 Drawing Sheets

(58) Field of Classification Search
CPC .......... H02M 7/5395; H02M 7/53873; H02M 7/53871; H02M 7/5387
See application file for complete search history.

(56) References Cited

U.S. PATENT DOCUMENTS

| | | |
|---|---|---|
| 2012/0280566 A1 | 11/2012 | Umland |
| 2013/0058144 A1* | 3/2013 | Hiramatsu .............. H02M 7/48 363/131 |
| 2013/0141951 A1 | 6/2013 | Adloff |
| 2015/0115906 A1* | 4/2015 | Ebisu ................... H02M 5/293 323/217 |
| 2015/0300320 A1 | 10/2015 | Diedrichs |
| 2016/0308459 A1* | 10/2016 | Fujii ...................... H02M 1/12 |

* cited by examiner

METHOD FOR THREE-PHASE SUPPLY INTO AN ALTERNATING VOLTAGE NETWORK, AND THREE-PHASE INVERTER

CROSS REFERENCE TO RELATED APPLICATIONS

This application is a continuation of International Patent Application number PCT/EP2020/056876, filed on Mar. 13, 2020, which claims priority to German Patent Application number 10 2019 106 583.6, filed on Mar. 14, 2019, and is hereby incorporated by reference in its entirety.

FIELD

The disclosure relates to a method for three-phase infeed of electrical power from a DC source into a three-phase AC grid by means of an inverter, and to an inverter configured for three-phase infeed of electrical power from a DC source into a three-phase AC grid.

BACKGROUND

Inverters that are connected to a three-phase AC grid and exchange electrical power with the AC grid generally operate in current-impressing fashion by virtue of the fact that the alternating currents flowing via the AC connections of the inverter and thus the exchanged power are predetermined, in principle, by the inverter itself. In the case of a photovoltaic generator as a DC source, the power converted into alternating current and exchanged with the AC grid regularly corresponds to the maximum possible power of the photovoltaic generator.

An inverter can additionally fulfill grid-supporting functions by virtue of the fact that the exchanged power is dependent possibly indirectly on properties of the AC grid, e.g. the frequency and/or the voltage. For this purpose, the exchanged power can be varied within the scope of the available DC power, for example in the case of a deviation of the grid frequency from a rated frequency of the AC grid.

An inverter can define and maintain an AC grid, i.e. operate in grid-forming fashion. In contrast to current-impressing, grid-supporting operation, an inverter for grid formation can be operated in a voltage-impressing fashion by virtue of the fact that the exchanged power is dependent directly on the properties of the AC grid, i.e. is a function of the frequency and/or the voltage in the AC grid. In this case, a voltage-impressing inverter can, for example, comprise so-called droop regulation or be operated as a so-called virtual synchronous machine. The operation of a power generating installation as a proactive grid forming apparatus here demands a significantly higher dynamic range of the connected DC source than just grid-supporting and in this respect reactive operation.

EP 1841050 A1 discloses a power generating installation comprising three single-phase inverters, wherein the three inverters are respectively connected to one of the three phases of the AC grid and are operated in current-impressing fashion largely independently of one another. As a result, the power generating installation can form a so-called unbalanced load by virtue of the fact that the individual inverters exchange different powers with the AC grid.

DE 102012220582 A1 discloses a method for three-phase infeed of electrical power by means of an inverter in which an asymmetry in the AC grid is detected and, in reaction thereto, an asymmetric current portion is fed in by the inverter. A comprehensive regulation structure configured for corresponding control of the inverter in direct reaction to a detected asymmetry is disclosed for this purpose.

EP 2348597 A1 discloses a method in which an asymmetry of powers flowing via the three phases of a grid connection point of an electrical installation is compensated for by means of an inverter by virtue of the fact that the inverter on the installation side of the grid connection point exchanges different powers with the AC grid via the three phases, wherein the differences in the exchanged powers precisely compensate for the asymmetry.

DE 102011085676 A1 discloses a similar method, wherein an infeed of electrical power into a three-phase AC grid is controlled phase-selectively by an inverter, taking account of active and reactive powers determined at an infeed point, in such a way as to minimize unbalanced loads at the infeed point. In that case, provision is made for the inverter to have three individually controllable outputs for respective connection to a phase of the three-phase AC grid.

DE 102010029951 A1 discloses a method for feeding in an unbalanced three-phase current into a three-phase AC grid in which the unbalanced current is generated by superposition of a positive phase-sequence system and a negative phase-sequence system, wherein a respective inverter module for generating the positive phase-sequence system and the negative phase-sequence system is provided.

In accordance with the prior art, therefore, a proactive asymmetric infeed of electrical power into a three-phase AC grid by means of a current-impressing power generating installation has only been possible heretofore by using three largely independently infeeding single-phase inverters or two independently infeeding three-phase inverters. Alternatively, an asymmetric infeed can be achieved by means of a regulation structure, the result of which is inherently dependent on the electrical properties of the AC grid; in particular, a voltage-impressing inverter can be used for asymmetric infeed, in which case, however, the infeed powers on the individual phases cannot be controlled in a targeted manner, but rather are dependent directly on the behavior of the connected AC grid.

SUMMARY

One problem addressed by the disclosure is that of demonstrating a method for asymmetric infeed of electrical power from a DC source into a three-phase AC grid via a three-phase current-impressing inverter in which the currents or powers fed into the AC grid via the individual phases can be set independently of one another in a simple and efficient manner.

A method for three-phase infeed of electrical power from a DC source into a three-phase AC grid by means of an inverter, wherein the inverter has a regulation circuit, and wherein the regulation circuit comprises a regulator circuit and a multiplier circuit is disclosed. The method comprises:
  measuring phase-specific grid voltages of the three-phase AC grid;
  determining a grid frequency from the measured phase-specific grid voltages; and
  generating phase-specific sinusoidal voltage reference values using the regulator circuit from the measured phase-specific grid voltages and the determined grid frequency. The phase-specific sinusoidal voltage reference values have phase-specific amplitudes and a common frequency corresponding to the respective amplitudes of the measured phase-specific grid voltages of the individual phases and the frequency of the grid voltages.

The method also comprises:
    generating phase-specific target current values using the multiplier circuit by forming products of phase-specifically predetermined target current amplitude values and the phase-specific sinusoidal voltage reference values and normalizing them phase-specifically to respective grid voltage amplitudes, and
    using the phase-specific target current values for driving power switches of the inverter.

In the method, therefore, according to the disclosure, predetermined target current amplitude values are multiplied phase-specifically by voltage reference values, wherein the phase-specific voltage reference values were generated (directly) from the measured grid voltages and have mathematically sinusoidal profiles whose amplitudes and frequency progress synchronously with the grid voltages of the individual phases. After a phase-specific normalization to the determined grid voltage amplitudes according to the disclosure, a simple mapping of the target current amplitude values to appropriately matching target current values is thus available, in particular without having to carry out a comparatively complex coordinate transformation. The resulting target current values are in turn phase-specific and have a sinusoidal time profile. The target current values are thus suitable for being used as target values for driving power switches of the inverter in a manner known per se, for example in the context of a conventional pulse width modulation (PWM).

In one embodiment of the method, the regulator circuit for generating the voltage reference values comprises a filter circuit, in particular a bandpass filter, or a generalized integrator circuit. In one embodiment a generalized integrator circuit (known as "second order generalized integrator") is advantageously suitable for determining the phase-specific sinusoidal voltage reference values since the output values of the generalized integrator can exactly simulate the basic grid-frequency profile of a sinusoidal grid voltage, without being influenced by higher-frequency disturbances.

The phase-specific predetermined target current amplitude values can be predetermined such that individually predetermined active powers are fed in on the phases. In conventional methods, only an electrical power to be exchanged overall, thus a summation power over all the phases, is predetermined and has to be converted into target values by way of complex transformations depending on the coordinate system used. In the method according to the disclosure, by contrast, it is straightforwardly possible to individually predetermine the active powers for the individual phases by means of the target current amplitude values since the conversion into phase-specific target current values is effected directly from the target current amplitude values in conjunction with the voltage reference values.

In one embodiment, the phase-specific predetermined target current amplitude values are predetermined such that the exchanged active powers on all of the phases have substantially the same magnitude. Balanced operation of the inverter can be ensured as a result.

Alternatively, the phase-specific predetermined target current amplitude values can be predetermined such that on at least one of the phases an active power having a given sign is exchanged with the AC grid, while an active power having an opposite sign is exchanged on at least one of the other phases. Consequently, the method makes it possible, in a simple manner, to generate asymmetric powers such that on one phase power flows from the inverter into the AC grid, while on another phase power flows from the AC grid into the inverter. This feature can be utilized if a significant asymmetry with regard to the power flows in the individual phases is already present in the AC grid.

In one embodiment of the method, using a further multiplier circuit, products of phase-specifically predetermined target reactive current amplitude values and phase-specific voltage reference values phase-shifted by 90 degrees in each case can be formed and added to the products of the phase-specifically predetermined target current amplitude values and the phase-specific voltage reference values. The resulting summation values can then be normalized phase-specifically to the respective grid voltage amplitudes. This results in target current values which contain both active current and reactive current portions and can be used as target values by the driving of the power switches of the inverter, such that the output currents of the inverter comprise phase-specifically both active and reactive powers. In this case, the target reactive current amplitude values can be predetermined such that individually predetermined reactive powers are fed in on the phases.

An inverter according to the disclosure for three-phase infeed of electrical power from a DC source into a three-phase AC grid has a regulation circuit configured to carry out a method in accordance with the description above.

BRIEF DESCRIPTION OF THE FIGURES

The disclosure is described and explained further below on the basis of exemplary embodiments illustrated in the figures.

DETAILED DESCRIPTION

Figure 1:
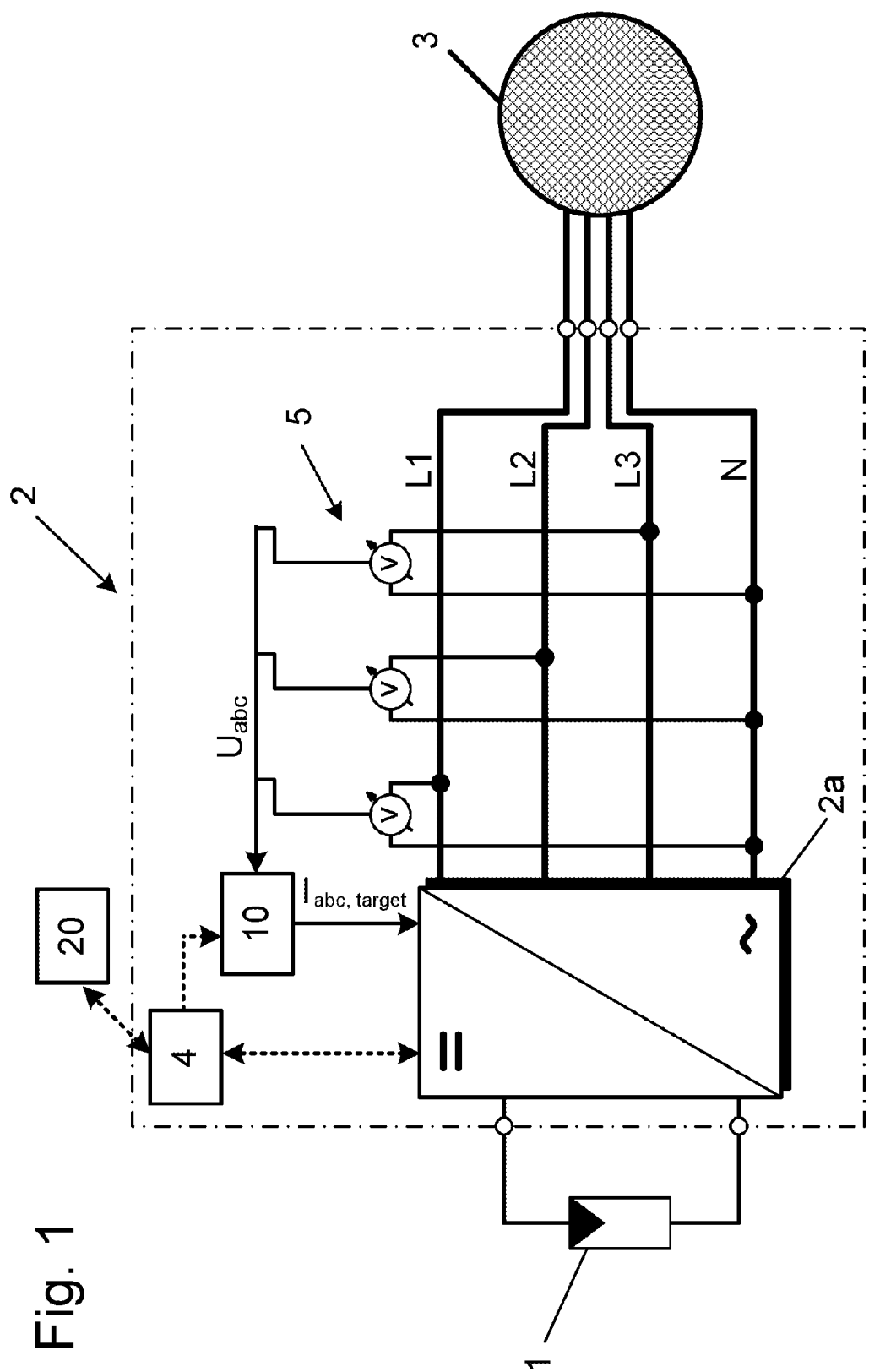
FIG. 1 shows a power generating installation connected to an AC grid.

FIG. 1 shows a simplified illustration of a power generating installation connected to an AC grid 3. The power generating installation comprises an inverter 2, which draws an electrical power from a DC source 1, illustrated as a photovoltaic generator by way of example in FIG. 1. The inverter 2 converts said power into an alternating current and feeds the latter into the AC grid 3 via the phase conductors L1, L2, L3 and optionally the neutral conductor N. For this purpose, the inverter 2 comprises an inverter bridge 2a comprising a number of power semiconductors, which can be arranged in the form of a bridge circuit between the DC inputs and the AC outputs of the inverter 2. The power semiconductors are driven by means of suitable clocking such that clocked application of the input-side DC voltage to the AC outputs of the inverter 2 excites alternating currents on the phase conductors L1, L2, L3, and optionally N, which correspond to phase-specifically predetermined target current values I_abc_target. For this purpose, the inverter bridge 2a can comprise an internal driving arrangement.

The inverter 2 has a controller 4, for example, controller circuitry, which is responsible for the operational control of the inverter 2. For this purpose, the controller 4 comprises for example functions such as starting and stopping the inverter 2, setting and optimizing the voltage at the DC input of the inverter, fault monitoring and the like. In particular, the controller 4 can interact with the inverter bridge 2a by measured values being transmitted from the inverter bridge 2a to the controller 4 and/or by the controller 4 predefining basic operating states of the inverter bridge 2a, e.g. normal operation or emergency shutdown.

Furthermore, the controller 4 can be connected to a further external measuring or control unit or circuit 20 and exchange data therewith. The external measuring or control unit 20 can be, for example, a power measuring device at a grid connection point between the inverter 2 and the AC grid 3. Alternatively or additionally, the external measuring or control unit 20 can be a control unit of a power generating installation comprising, besides the inverter 2, further electrical devices such as measurement points, generators, storage devices and/or loads, wherein the control unit 20 of such an installation can be connected to a plurality of the further electrical devices of the installation and can optionally influence or control the electrical behavior thereof.

The inverter 2 furthermore comprises a regulation circuit or structure 10. The regulation structure 10 is connected to voltage measuring means, sensors or circuits 5 which are respectively assigned to one of the phase conductors L1, L2 and L3 and to the neutral conductor N. The voltage measuring means 5 detect the grid voltages U_abc of the individual phases L1, L2, and L3. The regulation structure 10 receives the measured grid voltages U_abc from the voltage measuring means 5. For the construction of suitable voltage measuring means 5, various embodiments are known to the person skilled in the art, and so the concrete embodiment of the voltage measuring means 5 in according with FIG. 1 should be understood to be merely by way of example.

The regulation structure 10 is furthermore connected to the controller 4 of the inverter 2. The controller 4 communicates parameters to the regulation structure 10. The regulation structure 10 is configured to output phase-specific target current values I_abc_target to the inverter bridge 2a, wherein in one embodiment the target current values I_abc_target are determined by the regulation structure 10 depending on the parameters of the controller 4 and on the measured grid voltages U_abc. The inverter bridge 2a receives the target current values I_abc_target and, on the basis of internal driving—known per se—of the power semiconductors of the inverter bridge 2a, generates clocked output voltages suitable for exciting output currents which are oriented toward the target current values I_abc_target and largely correspond thereto particularly during normal operation of the inverter 2.

Figure 2:
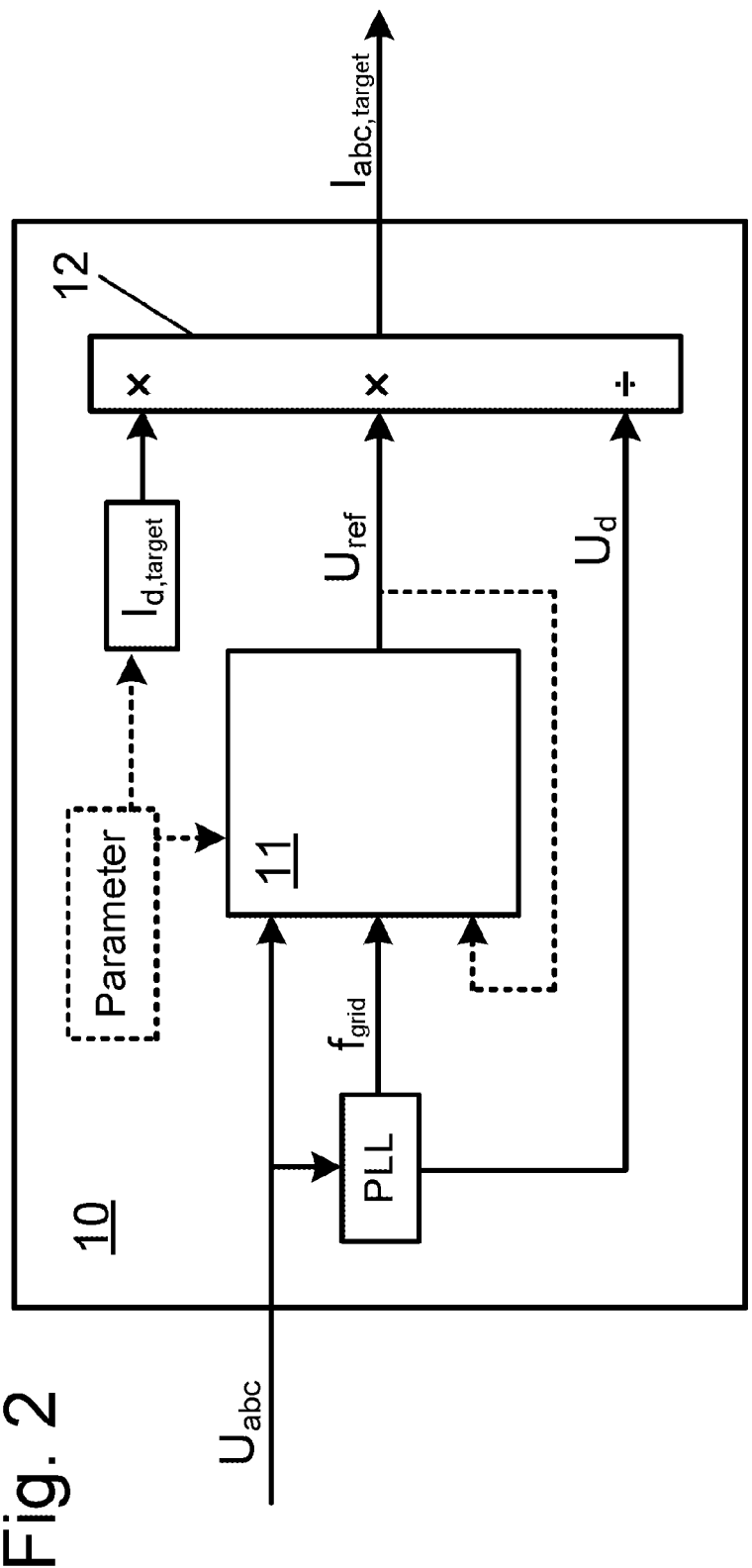
FIG. 2 shows one embodiment of a regulation circuit of an inverter.

FIG. 2 shows a schematic illustration of the regulation circuit or structure 10 of the inverter 2. The regulation structure 10 comprises a regulator circuit 11. The regulator circuit 11 receives various input variables. These input variables comprise general parameters, which can be predetermined by the controller 4 of the inverter 2, and the measured grid voltages U_abc. The input variables of the regulator circuit 11 furthermore include a grid frequency f_grid, wherein the grid frequency f_grid can be determined from the measured grid voltages U_abc, for example by means of a phase locked loop PLL or some other customary method.

From the, for example, instantaneous values of the grid voltages U_abc of the three phases of the AC grid 2 and the grid frequency f_grid, the regulator circuit 11 determines instantaneous voltage reference values U_ref for the three phases and outputs them. Feedback of the output voltage reference values U_ref to an input of the regulator circuit 11 can additionally be provided.

The regulator circuit 11 is designed or configured such that, on the one hand, in a manner deviating from the measured grid voltages U_abc, the voltage reference values U_ref have an ideally sinusoidal profile, i.e. follow three sine functions that are phase-offset relative to one another. On the other hand, the amplitudes of the voltage reference values U_ref correspond to the amplitudes of the measured grid voltages U_abc, and the frequency of the voltage reference values U_ref also corresponds to the grid frequency f_grid.

The voltage reference values U_ref thus simulate the profiles of the grid voltages in an idealized form by virtue of the voltage reference values U_ref having grid-voltage-synchronous sinusoidal profiles with regard to frequency and amplitude. This is achieved by virtue of the regulator circuit 11 comprising a frequency-selective regulation. A bandpass filter, for example, is suitable for this purpose, in one embodiment. By virtue of the feedback of the voltage reference values U_ref to the regulator circuit 11, optionally after scaling and/or delay, in particular a so-called generalized integrator can be used as the regulator circuit 11 in order that the determination of the voltage reference values U_ref is embodied in a further improved way.

The regulation circuit or structure 10 furthermore comprises a multiplier circuit 12. The multiplier circuit 12 receives the phase-specific voltage reference values U_ref from the regulator circuit 11 and phase-specific grid voltage amplitudes U_d, which can be determined from the measured grid voltages U_abc by way of the phase locked loop PLL, for example.

Phase-specific target current amplitude values I_d_target are made available at a further input of the multiplier circuit 12. The target current amplitude values I_d_target can consist of three values, in particular, which predefine the desired amplitudes of the output currents of the inverter 2 for the three phases of the AC grid 3. In this case, the target current amplitude values I_d_target applicable to the three phases concurrently can be chosen largely freely, in principle, at least within the scope of the performance of the DC source 1 connected to the inverter 2. In particular, it is possible to predefine both identical and distinctly different target current amplitude values I_d_target for the individual phases, wherein the target current amplitude values I_d_target are also intended to be able to have different signs, i.e. represent different flow directions of the active power from the inverter 2 into the AC grid 3, or vice versa.

According to FIG. 2, the target current amplitude values I_d_target can be generated in the regulation circuit or structure 10, in particular depending on the parameters that are communicated to the regulation structure 10 by the controller 4 of the inverter 2. Alternatively, the target current amplitude values I_d_target can also be communicated directly to the multiplier circuit 12 by the controller 4.

In one embodiment, in the multiplier circuit 12, the target current amplitude values I_d_target are multiplied phase-individually by the grid-frequency voltage reference values U_ref and divided by the phase-individual grid voltage amplitudes U_d. As the result, the multiplier circuit 12 outputs phase-individual target current values I_abc_target that are normalized to the actual amplitude of the grid voltage of the respective phase.

Figure 3:
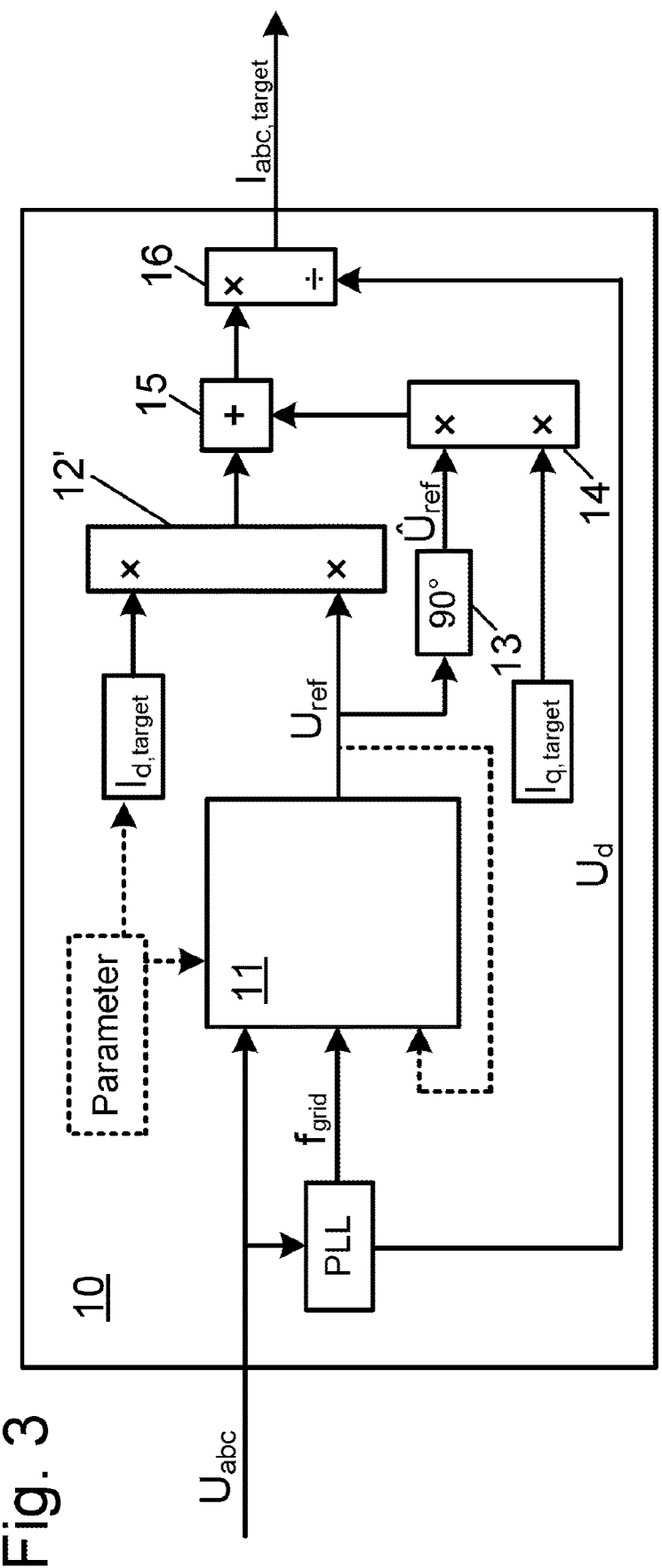
FIG. 3 shows a further embodiment of a regulation circuit of an inverter.

FIG. 3 shows an embodiment of the method according to the disclosure. In a manner supplementing the embodiment in accordance with FIG. 2, predetermined target reactive current amplitude values I_q_target are processed in the embodiment in accordance with FIG. 3. The target current amplitude values I_d_target predefine the desired amplitudes of the output currents of the inverter 2 which are respectively in phase with the grid voltages on the individual phases, such that the target current amplitude values I_d_target indirectly predefine the phase-specific active powers. By contrast, the target reactive current amplitude values I_q_target predefine desired phase-specific amplitudes of output currents of the inverter 2 which are phase-shifted by 90 degrees in each case relative to the grid voltages on the individual phases, such that the target reactive current amplitude values I_q_target indirectly predefine phase-specific reactive powers. It goes without saying that this phase shift can optionally correspond to an under-excitation or an over-excitation, i.e. can have a positive or negative sign.

In concrete terms, the voltage reference values U_ref can be phase-shifted by 90 degrees by means of a phase shifter circuit 13. For this purpose, the phase shifter 13 can comprise for example a transformation into an alpha-beta-0 coordinate system and back, wherein the phase shift by 90 degrees can be carried out particularly simply in the alpha-beta-0 coordinate system. The voltage reference values Û_ref phase-shifted in this way are multiplied by the predetermined target reactive current amplitude values I_q_target in a second multiplier circuit 14. The multiplication in the multiplier circuit 14 yields target reactive current values, which are added in an adder circuit 15 to target active current values generated from the voltage reference values U_ref and the target current amplitude values I_d_target by means of the multiplier circuit 12' in accordance with FIG. 2.

The sum of the target active and reactive current values that is calculated by the adder 15 is divided by the phase-individual grid voltage amplitudes U_d in a further multiplier circuit 16. As the result, the multiplier circuit 16 outputs phase-individual target current values I_abc_target that comprise both active current and reactive current portions and are normalized to the actual amplitude of the grid voltage of the respective phase.

The target current values I_abc_target calculated in this way in accordance with FIG. 2 or FIG. 3 are used for driving the power semiconductor switches of the inverter bridge 2a in accordance with FIG. 1. For this purpose, the inverter bridge 2a can comprise internal driving and ensures that the power semiconductors of the inverter bridge 2a are clocked in such a way that the currents fed into the AC grid 3 by the inverter 2 correspond to the target current values I_abc_target predetermined by the regulation circuit or structure 10. Regulating circuits of this type may comprise, for example, an AC current regulator circuit with pulse width modulation (PWM).

In embodiments of the disclosure, the target current amplitude values can be chosen in such a way that at least one of the following targets is achieved.

Characterization of Components of the Inverter 2:

For the characterization of components of the inverter 2, a test can be provided, which can optionally be carried out separately from normal operation of the inverter 2. In concrete terms, a capacitance of a usually divided DC link circuit of a neutral point clamped (NPC) inverter 2 can be determined by a positive target current amplitude value I_d_target being predetermined in each case for two of the three phases, while a negative target current amplitude value I_d_target is predetermined for the third of the three phases, wherein the sum of the target current amplitude value I_d_target is equal to zero. By means of the regulation structure 10 according to the disclosure, the inverter bridge 2a is caused to generate corresponding currents in the phases L1, L2, L3. As a result of such operation of the inverter 2, the currents on the phases with a positive target current amplitude value I_d_target are in phase with the profile of the grid voltage U_abc on these phases, while the current in the phase with a negative target current amplitude value I_d_target is in antiphase with respect to the profile of the grid voltage U_abc of this phase. Since the sum of the target current amplitude values I_d_target was chosen to be equal to zero, overall no active power is exchanged with the AC grid 3. On account of the sinusoidal profile of the alternating currents, however, there arises a dynamic redistribution of the energy in the two halves of the DC link circuit. This dynamic redistribution can be metrologically detected and evaluated in order to determine the partial capacitances of the DC link circuit.

Real Zero Infeed:

In an installation comprising a plurality of electrical units which are connected in single-phase fashion and which are connected to the AC grid 3 via a common grid connection point, asymmetric power flows can occur at the grid connection point, wherein on individual phases power flows from the AC grid 2 into the installation, while on other phases power flows from the installation into the AC grid 2. That can be counteracted by the powers at the grid connection point being measured phase-specifically and the target current amplitude values I_d_target being modified, for example by a central installation controller 20 or the controller 4 of the inverter 2 itself, such that the powers at the grid connection point are regulated for each phase individually to a predefined value, in particular to zero.

Fuse Protection:

Analogously to zero infeed, the power flowing via individual phases at the grid connection point can be limited by predefining correspondingly oppositely directed changes in the target current amplitude values I_d_target for the affected phase. As a result, overcurrents on individual phases can be effectively prevented as long as the sum of the powers on all of the phases is less than a power permissible overall at the grid connection point.

The invention claimed is:

1. A method for three-phase infeed of electrical power from a DC source into a three-phase AC grid by means of an inverter, wherein the inverter has a regulation circuit, and wherein the regulation circuit comprises a regulator circuit and a multiplier circuit, comprising:

measuring phase-specific grid voltages of the three-phase AC grid;

determining a grid frequency from the measured phase-specific grid voltages;

generating phase-specific sinusoidal voltage reference values using the regulator circuit from the measured phase-specific grid voltages and the determined grid frequency, wherein the phase-specific sinusoidal voltage reference values have phase-specific amplitudes and a common frequency corresponding to the respective amplitudes and frequency of the measured phase-specific grid voltages of individual phases of the three-phase AC grid, generating phase-specific target current values using the multiplier circuit by forming products of phase-specific predetermined target current amplitude values and the phase-specific sinusoidal voltage reference values and dividing the formed products by respective phases of grid voltage amplitudes, and using the phase-specific target current values for driving power switches of the inverter.

2. The method as claimed in claim 1, wherein the regulator circuit for generating the phase-specific sinusoidal voltage reference values comprises a bandpass filter or an integrator circuit.

3. The method as claimed in claim 1, wherein the phase-specific predetermined target current amplitude values are predetermined such that individually predetermined active powers are fed in on the phases.

4. The method as claimed in claim 1, wherein the phase-specific predetermined target current values are predetermined such that a same or substantially a same active power is fed in on all of the phases.

5. The method as claimed in claim 1, wherein the phase-specific predetermined target current values are predetermined such that on at least one of the phases an active power is fed in which has an opposite sign in comparison with an active power on at least one other phase.

6. The method as claimed in claim 1, further comprising:
using a further multiplier circuit, forming products of phase-specific predetermined target reactive current amplitude values and phase-specific voltage reference values phase-shifted by 90 degrees in each case, adding the formed products to products of the phase-specific predetermined target current amplitude values and the phase-specific voltage reference values to form a summation; and
normalizing the resulting summation values phase-specifically to the respective grid voltage amplitudes.

7. The method as claimed in claim 6, wherein the phase-specific predetermined target reactive current amplitude values are predetermined such that individually predetermined reactive powers are fed in on the phases.

8. An inverter for three-phase infeed of electrical power from a DC source into a three-phase AC grid, wherein the inverter has a regulation circuit configured to:
measure phase-specific grid voltages of the three-phase AC grid;
determine a grid frequency from the measured phase-specific grid voltages;
generate phase-specific sinusoidal voltage reference values from the phase-specific measured grid voltages and the determined grid frequency, wherein the phase-specific sinusoidal voltage reference values have phase-specific amplitudes and a common frequency corresponding to the respective amplitudes and frequency of the measured phase-specific grid voltages of individual phases of the three-phase AC grid;
generate phase-specific target current values by forming products of phase-specific predetermined target current amplitude values and the phase-specific sinusoidal voltage reference values and dividing the formed products by respective phases of grid voltage amplitudes; and
use the phase-specific target current values for driving power switches of the inverter.

9. The inverter of claim 8, wherein the regulation circuit comprises a regulator circuit and a multiplier circuit.

10. The inverter of claim 9, wherein the regulator circuit is configured to generate the phase-specific sinusoidal voltage reference values from the phase-specific measured grid voltages and the determined grid frequency, wherein the phase-specific sinusoidal voltage reference values have phase-specific amplitudes and a common frequency corresponding to the respective amplitudes and frequency of the measured phase-specific grid voltages of the individual phases.

11. The inverter of claim 9, wherein the multiplier circuit is configured to generate the phase-specific target current values by forming products of the phase-specific predetermined target current amplitude values and the phase-specific sinusoidal voltage reference values and normalizing them phase-specifically to respective grid voltage amplitudes.

* * * * *